United States Patent [19]

Everest

[11] Patent Number: 4,494,881
[45] Date of Patent: Jan. 22, 1985

[54] INTRA-OPTICAL LIGHT BEAM SIGHTING SYSTEM FOR AN INFRARED THERMOMETER

[76] Inventor: Charles E. Everest, 11662 Pincian Way, Santa Ana, Calif. 92705

[21] Appl. No.: 356,869

[22] Filed: Mar. 10, 1982

[51] Int. Cl.³ .............................................. G01J 5/08
[52] U.S. Cl. .................................. 374/124; 250/353; 356/72; 356/353; 374/130
[58] Field of Search ............... 374/121, 112, 129, 124, 374/130; 33/241; 356/43, 72, 399, 153; 250/461, 334, 353, 341, 342, 72

[56] References Cited

U.S. PATENT DOCUMENTS

| | | | |
|---|---|---|---|
| 1,948,941 | 2/1934 | Olpin | 250/353 |
| 3,017,513 | 1/1962 | Messelt | 250/353 X |
| 3,441,348 | 4/1969 | Nichols et al. | 356/43 |
| 3,451,254 | 6/1969 | Maley | 374/124 X |
| 3,518,005 | 6/1970 | Weber | 356/153 X |
| 3,528,748 | 9/1970 | Burch et al. | 356/153 X |
| 3,531,205 | 9/1970 | Mussmeier | 356/153 X |
| 3,761,713 | 9/1973 | Merrill | 250/341 |
| 3,765,779 | 10/1973 | Hunt et al. | 374/129 X |
| 4,005,605 | 2/1977 | Michael | 374/129 |
| 4,005,698 | 2/1977 | Cuomo et al. | 374/121 X |
| 4,035,654 | 7/1977 | Elmer | 250/491 |
| 4,045,670 | 8/1977 | Anderson et al. | 374/129 |
| 4,078,179 | 3/1978 | Everest | 250/338 |
| 4,132,902 | 1/1979 | Everest | 307/116 |
| 4,142,799 | 3/1979 | Barton | 356/153 |
| 4,183,482 | 1/1980 | Jozwiak | 250/342 X |
| 4,215,273 | 7/1980 | Frosch et al. | 356/72 X |
| 4,301,682 | 11/1981 | Everest | 374/112 |
| 4,330,208 | 5/1982 | Eloy | 250/491 X |

Primary Examiner—Daniel M. Yasich
Attorney, Agent, or Firm—Leonard Tachner

[57] ABSTRACT

A sighting system primarily for use with infrared thermometers and that provides a visible light beam, the geometry of which is congruent with the field of view of the infrared optics of the thermometer to provide the user with an accurate representation of the intersection of the field of view cross-section of the object of which the temperature is being measured by the thermometer. Two novel embodiments are disclosed, one of which utilizes Fresnel lenses and one of which utilizes a Cassegrainian lens system. Both embodiments provide means for accommodating an isolated visible light source and passage of the visible light generated therefrom through the identical lens system used by the infrared detector to develop the signal indicative of the infrared energy and therefore temperature generated by the object to which the infrared thermometer is directed.

5 Claims, 5 Drawing Figures

INTRA-OPTICAL LIGHT BEAM SIGHTING SYSTEM FOR AN INFRARED THERMOMETER

BACKGROUND OF THE INVENTION

1. Field of the Invention

The present invention pertains generally to infrared thermometers and more specifically, to an improved infrared thermometer apparatus including means for making more accurate temperature measurements by providing an observable indication of the precise field of view of the infrared radiation upon which the temperature measurement is based.

2. Prior Art

It is well-known in the art to utilize infrared thermometers. Such temperature measuring devices are used in measuring the temperature of an object or a series of closely spaced adjacent objects by measuring the relative infrared radiation levels using an infrared detector such as a thermopile. In these devices it is typical for a circuit to be used to convert the signal produced by the infrared detector and associated circuitry such as, for example, an amplifier and a linearization circuit, into an output signal capable of indicating a numerical value. This output signal is then utilized in a meter type structure such as a digital display or a known meter movement in order to indicate a numerical temperature value. Exemplary of such prior art devices are those disclosed in U.S. Pat. Nos. 4,078,179; 4,132,902 and 4,301,682, all issued to the applicant of the present invention.

The technology of infrared thermometry has matured to the point at which currently available infrared thermometers can provide an accuracy of 0.5 degrees centigrade over a temperature range of from −30 degrees centigrade to +100 degrees centigrade. In addition, infrared thermometers can now accurately measure the temperature of objects located at any distance from as near as one inch from the instrument to as far as 1000 feet or more from the instrument as long as the object completely fills the instrument's field of view. It is therefore, highly desirable for a user of a infrared thermometer to be able to discern the outline of the intersection of the infrared field of view with the body of which the temperature is being measured by the infrared thermometer.

Discerning the outline of this intersection is important in some applications even when it is clearly obvious that the object completely fills the instrument's field of view. By way of example, there may be occasions when it is desirable to measure the temperature of a specific portion of a larger object such as a particular leaf or stem of a plant in agricultural applications or on the forehead of a patient in medical applications. In this latter example it is particularly desirable to be able to observe the intersection of a field of view of the infrared detector and a selected portion of a patient when the instrument is being used to measure the patient's temperature from any substantial distance to the patient as may be the case when an infrared thermometer is used to spot check the forehead temperatures of sleeping infants in a hospital nursery.

Providing a user with the opportunity to observe the cross-section of the field of view of the infrared detector with an object is particularly advantageous during temperature measurements being made at distances substantially exceeding the focal length of the infrared optics which is normally in the range of about 2 to 4 inches where it provides means for viewing both the cross-section field of view as well as the temperature reading concurrently. This latter feature is particularly important in a portable hand-held infrared temperature apparatus where it is quite likely that the instrument will be moved over the period between observation of the field of view cross-section and observation of the temperature measurement. Those having skill in the art to which the present invention pertains will understand that even the slightest inadvertent motion of the infrared thermometer, particularly at measurement distances greater than several feet, will significantly change the position of the field of view cross-section relative to the object and may therefore result in gross inaccuracies in the temperature measurement.

There have been some attempts made in the prior art to provide portable hand-held infrared thermometers which provide some means for pointing the instrument at a particular location to enhance the accuracy of the temperature measurement. By way of example, Raytek Incorporated of Mountain View, Calif. provides a hand-held infrared thermometer designated RAYNGER II which provides a sighting telescope which permits the user to point the instrument at a precise location designated by the cross-hairs in the telescope. However, this prior art instrument does not provide the user with any accurate observation of the actual outline of the field of view intersection with the object being measured, nor does it solve the aforementioned problem of inadvertent hand motion between observation through the telescope and observation of the temperature measurement. In other prior art devices a source of light such as a small incandescent light bulb is provided at the front of the instrument and creates a beam of light that can be of some assistance in positioning the infrared field of view relative to an object at or near the focal point of the infrared optics. However, the beam of light becomes relatively indiscernible at distances exceeding the focal length of the optics and in addition, presents the danger of substantially reducing the accuracy of the temperature measurement process by introducing a source of high temperature (the incandescent lamp) that is located near the infrared detector. Finally, such prior art devices that use a bare incandescent lamp as a pointing indicator which only operates favorably at or near the focal point of the infrared optics, render it virtually impossible to monitor the position of the light beam on an object while simultaneously reading the temperature measurement. Consequently, the aforementioned prior art disadvantage with respect to inadvertent movement of a hand-held portable infrared thermometer is likely to still be a problem.

SUMMARY OF THE INVENTION

The present invention comprises a light beam sighting system for an infrared thermometer wherein a source of visible light such as an incandescent lamp or strobe light is utilized in conjunction with optical components capable of simultaneous operation with both infrared and visible light to provide a convenient visual outline of the intersection of the cross-section of the infrared field of view with the object of which the temperature is being measured. It will be seen hereinafter that because the visible light and infrared light pass through the same optical components and because the aperture of the source of visible light is chosen to be equal in area to the aperture of the infrared detector, the field of view of the visible light beam is identical to the field of view of the infrared. Accordingly, irrespective of the distance between the object of which the temperature is being measured and the face of the instrument in which the present invention is utilized, the user will be able to conveniently observe the precise position of the cross-section of the field of view of both the visible light beam and the infrared energy with the object.

Two embodiments of the invention are disclosed herein. In both embodiments one may use either an incandescent light source or a xenon gas discharge strobed arc lamp as the light source. Two embodiments of optical components are disclosed. In one embodiment the visible light source and the infrared detector share Cassegrainian optics and in a different embodiment they share Fresnel optics wherein the visible light aperture is provided by means of either a totally internal reflecting light pipe or by means of a focal point of a conventional lens imaging system to separate the visible light source from the infrared detector. In both optical systems disclosed herein, a beam splitter is utilized as a means for both optically and thermally isolating the visible light source from the infrared detector.

OBJECTS

It is therefore a primary object of the present invention to provide an intra-optical light beam sighting system for an infrared thermometer which entirely overcomes or substantially reduces the aforementioned disadvantages of the prior art.

It is an additional object of the present invention to provide an intra-optical light beam sighting system for an infrared thermometer including those of the portable hand-held configuration and which provides an accurate and readily discernible outline of the intersection of the field of view cross-section of the infrared optics with the object of which the temperature is being measured.

It is still an additional object of the present invention to provide a visible light beam sighting system for an infrared thermometer including those of the transportable hand-held configuration and which utilizes a visible light source aperture equal to the aperture of the infrared detector and which shares a common set of optical components to generate a visible sighting beam which is three dimensionally congruent with the invisible beam of the infrared detector.

It is still a further object of the present invention to provide a visible light beam sighting system for an infrared thermometer including those of the portable hand-held configuration and which generates an outline of the intersection of the field of view cross-section and the object of which the temperature is being measured and which permits convenient observation of that intersection outline while observing the temperature measurement display to minimize the likelihood of inadvertent movement of the instrument which would otherwise tend to detrimentally affect the accuracy of the temperature measurement.

BRIEF DESCRIPTION OF THE DRAWINGS

The aforementioned objects and advantages of the present invention as well as additional objects and advantages thereof will be more fully understood hereinafter as a result of the detailed description of preferred embodiments of the invention when taken in conjunction with the accompanying drawings in which.

DETAILED DESCRIPTION OF THE INVENTION

Figure 1:
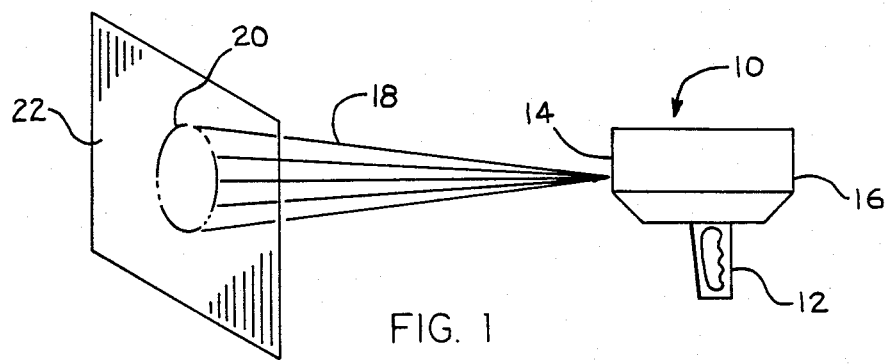
FIG. 1 is a isometric illustration of an infrared thermometer incorporating the present invention.

Referring now to FIG. 1 there is shown therein a hand-held gun-like infrared temperature measuring instrument 10 of the type having a handle 12 for providing a convenient means for holding and directing the instrument, having a front face 14 in which a conventional narrow beam infrared sensor (not shown) may be directed toward an object, the temperature of which is to be measured, and having a rear face 16 which typically includes a conventional meter-type structure (not shown) such as a digital display or a known meter movement to indicate a numerical temperature value as is well-known in the art.

A representative radiation cone 18 is also shown in FIG. 1. Cone 18 represents the typical infrared radiation field of view of an infrared thermometer and circular outline 20 represents the intersection of radiation cone 18 with a surface of an object 22 towards which instrument 10 is directed to measure the temperature thereof. Of course, those having skill in the art to which the present invention pertains will understand that for infrared thermometers of the prior art, radiation cone 18 represents the field of view boundary for invisible infrared radiation and that therefore, circular line 20 which represents the intersection of that radiation field of view with the surface of object 22 is also invisible. However, it will be seen hereinafter that the present invention provides a means in instrument 10 to generate a light beam therefrom using a visible light source having an aperture equal to the aperture of the detector and also using the identical optics used by the infrared detector so that radiation cone 18 represents the three dimensional boundaries of the field of view of the visible light.

Therefore, by means of the present invention, the circular area defined by circular line 20 on the surface of object 22 is rendered visible providing a readily discernable indication of the intersection of the field of view of the infrared radiation optics of instrument 10 with the surface of any object to which the instrument is directed for the purpose of measuring the temperature thereof. As a result, the present invention renders it convenient for the user of an infrared thermometer to observe the precise location of the surface area of an object which contributes to the infrared radiation used by the instrument for the temperature measurement. Consequently, the present invention renders it possible for a user to point the instrument at a precise location and to define the total area of radiation being sensed by the instrument to thus avoid any temperature measurement inaccuracy. Such inaccuracy may be due to either misdirecting the instrument or to a failure to fill the total field of view intersection with the object. Furthermore, as seen in FIG. 1, because the user may easily observe the outline of the field of view intersection on the object by merely looking out beyond the instrument while it is being held, he may, with only the slightest, virtually imperceptible eye movement, read the temperature indication at the rear of the instrument while minimizing the possibility of inadvertent movement of the instrument relative to the object 22. It will be understood hereinafter that FIG. 1 merely illustrates a typical thermometer which can be implemented with the present invention and further illustrates the beam congruence feature of the invention. Details of implementing the light beam sighting system of the invention will be discussed hereinafter in conjunction with FIGS. 2–5.

Figure 2:
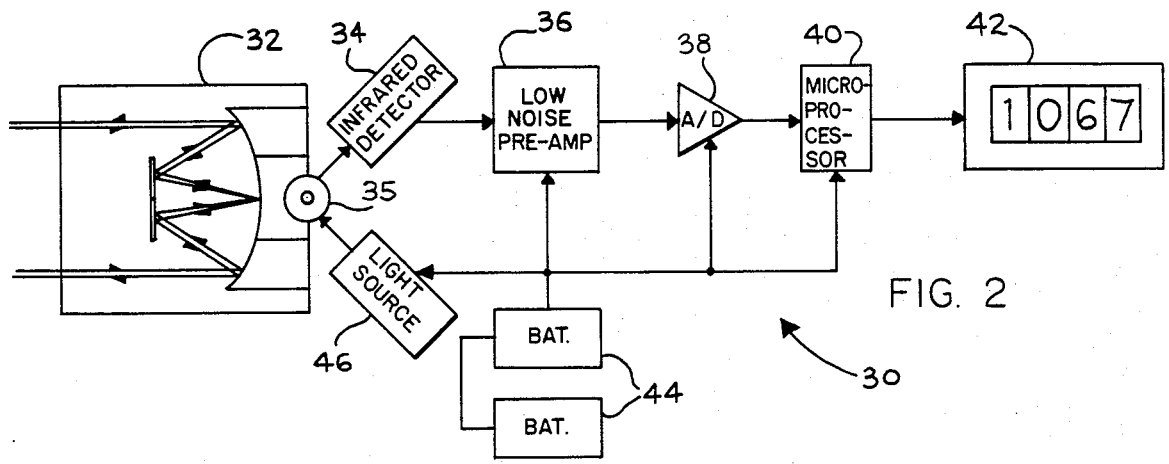
FIG. 2 is a block diagram of a typical infrared thermometer that has been improved in accordance with the present invention, namely, implementation of a visible light source and optical assembly which provide concurrent, non-interfering and congruent visible and infrared beams.
Figure 3:
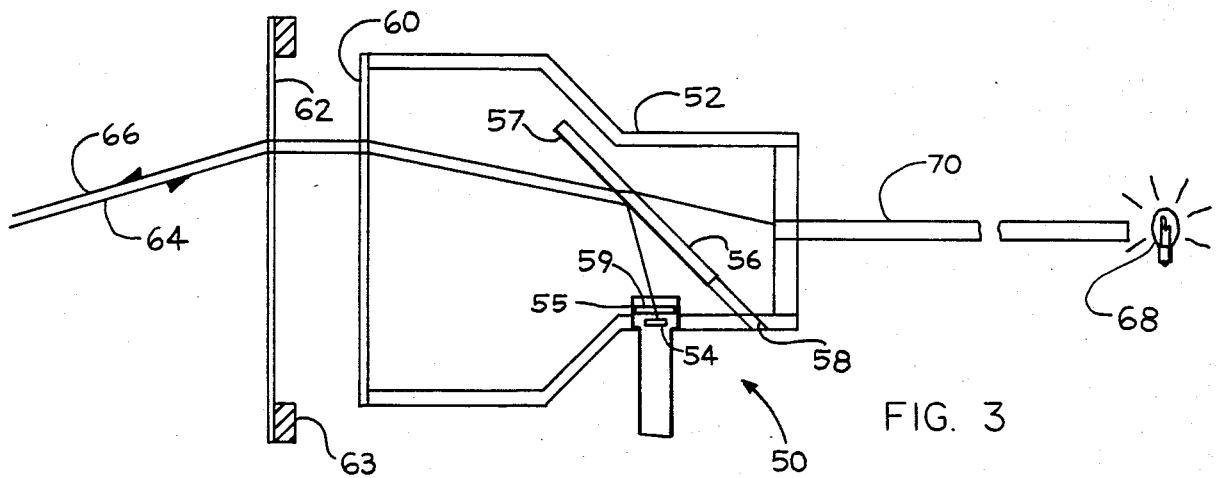
FIG. 3 is a schematic illustration of the optical portion of a first embodiment of the invention.
Figure 4:
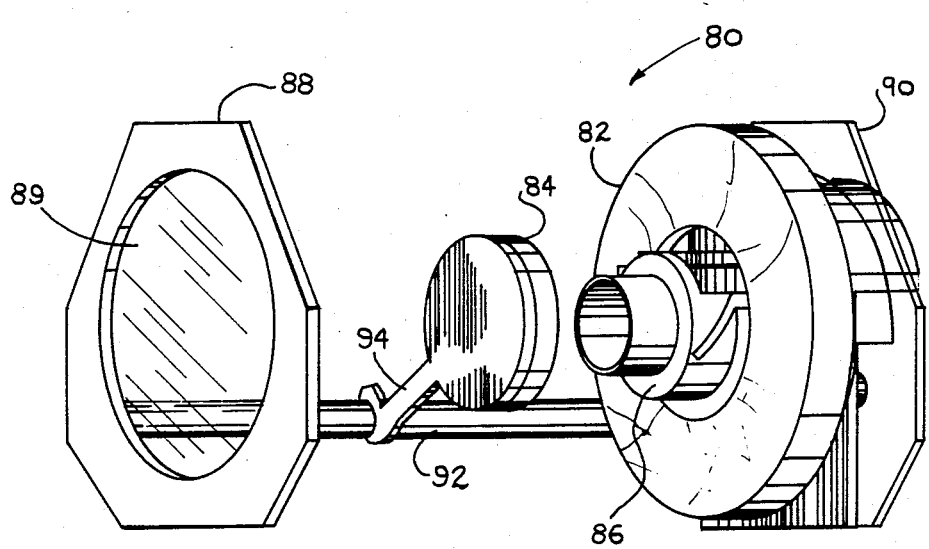
FIG. 4 is a three-dimensional illustration of a first embodiment of an optical assembly for use in the invention.

Referring to FIG. 2 there is shown a simplified block diagram of an infrared thermometer employing the present invention. More specifically, as seen in FIG. 2, infrared thermometer 30 comprises an optical assembly 32, an infrared detector 34, a low noise preamplifier 36 and analog-to-digital converter 38, a digital microprocessor chip 40, a digital display device 42 and a pair of rechargeable batteries 44. The above enumerated components of an infrared thermometer are typically all housed within an instrument such as instrument 10 of FIG. 1, are well-known in the art and no invention is claimed herein in any of such components or in their combination as represented in FIG. 2. The conventional components are distributed within instrument 10 in a well-known manner. For example, digital display device 42 of FIG. 2 would usually be mounted on rear face 16 of the instrument and optical assembly 32 would usually be mounted adjacent front face 14 of instrument 10. However, FIG. 2 also illustrates the use of a visible light source 46 which utilizes the same optical assembly 32 as the infrared detector 34. A beam splitter 35 permits concurrent infrared and visible light operation. It is this novel addition of a visible light source configured within the thermometer to make use of the same optical assembly used by the infrared detector that is deemed to be novel in the present invention. Furthermore, the applicant has discovered two novel optical configurations which provide for the use of a visible light source in a manner which permits concurrent use of a common optical assembly by both the visible light source and the infrared detector for the purpose of generating a visible sighting beam which provides an accurate indication of the cross-section of the infrared field of view where it intersects the surface of an object, the temperature of which is being measured by the infrared thermometer. Reference will now be made to FIGS. 3 and 4 which provide illustrations of alternative embodiments of optical assemblies of the present invention, namely, a Fresnel lens embodiment in FIG. 3 and Cassegrainian lens configuration in FIG. 4. These embodiments of FIGS. 3 and 4 provide examples for implementing an intra-optical light beam sighting system wherein a visible light source 46 of FIG. 2, can be included in an infrared thermometer for beam congruence without affecting the accuracy of the temperature measurement. Each such embodiment may be readily mounted in an instrument of the type illustrated in FIG. 1 in a well-known manner.

THE FRESNEL LENS EMBODIMENT

The Fresnel lens embodiment 50 of the invention as illustrated in FIG. 3 comprises an assembly housing 52, an infrared detector 54, a beam splitter 56 mounted in a beam splitter housing slot 58 in housing 52, a pair of Fresnel lenses 60 and 62, the former of which is mounted to housing 52 and the latter of which is spaced therefrom and supported by a front lens mount 63. Lens 62 may function as front face 14 of instrument 10 of FIG. 1. A representative infrared ray 64 emanating from a target to which the present invention is directed is illustrated in FIG. 3 and as shown therein, is refracted by Fresnel lenses 62 and 60 in that order and is then reflected by beam splitter 56 whereby to impinge upon infrared detector 54. As is conventional in the art, infrared detector 54 is mounted within a baffle 55 which functions as an optical shield to limit the detector field of view and the infrared representative beam 64 is made to pass through a bandpass spectral filter detector window 59 of selected bandpass wavelength such as the range of 5 micrometers to 20 micrometers. The surface 57 of beam splitter 56 from which the infrared representative light beam 64 is made to reflect on infrared detector 54, is preferably coated by an infrared reflecting and visible light transmitting coating such as Model IR-81-E conductive infrared reflection coating manufactured by the Liberty Mirror Division of Liberty Owens Ford Company.

As seen in the left-most portion of FIG. 3, a second representative ray 66 is virtually coincident with infrared ray 64. Actually these rays are precisely coincident and are shown separated for identification purposes only. Ray 66 is a representative visible light ray illustrating the light energy developed by a visible light source 68 such as an incandescent lamp or strobe light. Visible light source 68 is an illustrative implementation of the light source 46 shown in block form in FIG. 2 and would be typically contained within instrument 10 of FIG. 1 for example for operation in accordance with the block diagram of FIG. 2. In the preferred embodiment of the optical assembly 50 illustrated in FIG. 3 the light energy developed at light source 68 is transmitted to housing 52 by means of a light pipe 70. By way of example, light pipe 70 may be a total internal reflecting clad rod light pipe of dimensions suitable for providing a two millimeter effective visible light aperture which in the preferred embodiment, would be an aperture equivalent to that of the infrared detector 54. Those having skill in the art of optics and to which the present invention pertains will appreciate that by providing a light pipe and infrared detector having equal effective apertures and by locating those two components at the same respective distances from the beam splitter which is symmetrically placed therebetween, the field of view of the infrared detector will be identical to that of the visible light as long as the frequency difference does not create a refractive distinction in the Fresnel lenses 60 and 62. To this end applicant has discovered the advantageous use of polyethylene positive focal length aspheric Fresnel lenses 60 and 62 which may be used advantageously for the focusing optics of the present invention. By way of example, Fresnel lens 60 may be a 2½ inch focal length 50 groove per inch polyethylene Fresnel lens manufactured by Lectric Lites Company of Fort Worth, Tex. Similarly, Fresnel lens 62 may be a lens manufactured by the same company and having preferably a somewhat longer focal length to coincide with the smallest object focal distance for which the thermometer is to be used. By way of example, a typical focal length for Fresnel lens 62 may be anywhere in the range of 4 to 8 inches. However, it will be understood that this length may be varied by selecting Fresnel lenses with different focal lengths such as less than one inch to greater than several feet depending upon the desired application and size limitations of the instrument.

It will be understood that a similar Fresnel lens or other conventional collimating lens device may be used in place of light pipe 70 to present the visible light to the assembly housing 52 and beam splitter 56 with requisite effective aperture and intensity. It will also be understood that the intensity may vary depending upon the selection of the light source. By way of example, for outdoor applications where a higher intensity visible light may be desirable, it may be advantageous to use a bulb-type pulse Xenon flash lamp such as those manufactured by the U.S. Scientific Instruments Company of Boston, Mass. It is not unusual for the latter type light source to provide a light level that is at least 100 times brighter than that of a conventional incandescent lamp but that still uses the same amount of DC power by virtue of using a much lower duty cycle flashing rate than that which would be normally employed by an incandescent lamp. For example, in two embodiments of the present invention reduced to practice, the applicant has found it preferable to flash an incandescent lamp at a 50% duty cycle while the duty cycle of the strobe light Xenon flash is only 0.004%.

CASSEGRAINIAN LENS EMBODIMENT

Figure 5:
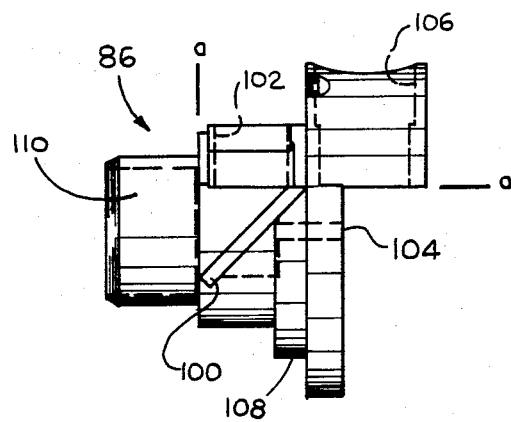
FIG. 5 is a side view of a component of the optical assembly illustrated in FIG. 4.

The cassegrainian lens embodiment 80 of the optical assembly of the present invention illustrated in FIG. 4 provides an alternative lens configuration for achieving the desired result of having the infrared radiation and visible light field be identical. As seen in FIG. 4 this second embodiment of the invention comprises a concave mirror 82, a convex mirror 84, a housing 86, front and rear optical assembly supports 88 and 90 respectively, a spacer member 92 and a convex mirror support member 94. The structure of housing 86 is further illustrated in FIG. 5 where it is shown that it comprises a beam splitter housing slot 100, an infrared detector retention aperture 102, a visible light path aperture 104, an electro-mechanical shutter retention aperture 106, a mirror mounting flange 108 and a cylindrical baffle 110. Although housing 86 may be manufactured from one unitary structural configuration, in practice it has been found preferable for machining purposes to provide housing 86 in the form of two interconnectible portions which may be separated along line a—a as seen in FIG. 5.

In either case, housing 86 performs a function similar to housing 52 of the first embodiment of the invention illustrated in FIG. 3. More specifically, housing 86 provides means for mounting a beam splitter having the same characteristics as beam splitter 56 described earlier with reference to the first embodiment. Housing 86 also provides support for the infrared detector (not shown) as well as an aperture of cylindrical shape, the axis of which intersects the beam splitter for transmitting the visible light energy therethrough. The visible light may be provided in an identical fashion as that previously discussed in conjunction with the first embodiment of the invention. More specifically, a visible light source and light pipe are aligned with the aperture 104 and provide an effective aperture equivalent to that of the detector. Spacer member 92 may be extended beyond rear support 90 to provide mounting structure for a light source and light pipe in much the same way mirror 84 is supported. The visible light is transmitted through the beam splitter retained within beam splitter housing slot 100 and passes through baffle 110 where it is incident upon convex mirror 84 seen in FIG. 4. The light energy incident upon convex mirror 84 is reflected onto concave mirror 82 from which it is then reflected through transparent member 89 and exits the infrared thermometer. Member 92 may function as the front face 14 of instrument 10 of FIG. 1. The transmission of infrared radiation, usually into the infrared thermometer through transparent member 89, occurs in the reverse direction. More specifically, incident infrared radiation impinges upon concave mirror 82 which reflects it on convex mirror 84 which, in turn, reflects the infrared energy through baffle 110 where it strikes the reflective surface of the beam splitter contained within beam splitter housing slot 100. Baffle 110 functions as a shield to limit the field of view. It will be understood that the surface upon which the infrared radiation impinges on the beam splitter in the optical configuration of FIGS. 4 and 5 is coated with the same coating as described earlier for beam splitter 56 of the first embodiment of the invention illustrated in FIG. 3. Consequently, the infrared energy is reflected up towards the infrared detector which is contained within detector retention aperture 102. It will also be understood that the effective aperture of the infrared detector is made to equal the effective aperture of the visible light source and furthermore that their relative distances from the beam splitter in slot 100 are identical so that the respective fields of view of the infrared invisible light energy are identical as in the previous embodiment.

It will now be understood that what has been disclosed herein comprises a novel intra-optical light beam sighting system for an infrared thermometer wherein a source of visible light such as an incandescent lamp or strobe light is utilized in conjunction with optical components capable of simultaneous operation with both infrared and visible light to provide a convenient visual outline of the intersection of the cross-section of the infrared field of view with the object of which the temperature is being measured. As a result, the present invention provides an accurate and readily discernible outline of the intersection of the field of view cross-section of the infrared optics with that object. Two preferred embodiments of the invention have been disclosed, both of which utilize a visible light source aperture that is equal to the aperture of the infrared detector and which use a common set of optical components to generate a visible sighting beam which is three-dimensionally congruent with the invisible infrared beam incident upon the infrared detector.

Those having skill in the art to which the present invention pertains will, as a result of applicant's teaching herein, now understand that there may be numerous modifications and additions which may be implemented to accomplish the purpose of the present invention, namely, that of providing a structure which permits a visible light beam to be generated through the same optics through which the infrared beam is received in an infrared thermometer to provide the user with an accurate indication of the intersection of the field of view of the infrared energy with the object of which the temperature is being measured. By way of example, it will now be clear that there may be various other optical assemblies which accomplish the aforementioned dual purpose of passing visible light and infrared through the same lens components while isolating the visible light source from the infrared detector to prevent inadvertent impingement of the visible light on the detector which would otherwise detrimentally effect the accuracy of the temperature measurement. In addition, there may be modifications to those lens configurations disclosed. For example, the convex mirror of FIG. 4 could be replaced by a planar or another concave mirror depending upon the desired optical characteristics. However, all such modifications and additions are deemed to be within the contemplated scope of the present invention which is to be limited only by the claims appended hereto.

I claim:

1. In an infrared thermometer of the transportable type, housing an infrared detector for generating a signal representative of the infrared energy transmitted to the thermometer from an object of which the temperature is to be measured and having a display for indicating the measured temperature; the improvement comprising:

a source of visible light contained within said thermometer, an optical lens apparatus having equal effective spaced aperture means in said thermometer for directing said infrared energy onto said infrared detector and for transmitting said visible light out of said thermometer, the beam of infrared energy and visible light being congruent between said thermometer and said object whereby a visible intersection of the infrared field of view of the thermometer with said object is provided, and means separating said light source from said detector preventing said visible light from being incident on said infrared detector.

2. The improvement recited in claim 1 wherein said optical lens apparatus comprises at least one Fresnel lens.

3. The improvement recited in claim 1 wherein said optical lens apparatus comprises a Cassegrainian configuration of mirrors.

4. The improvement recited in claims 1, 2 or 3 wherein said optical lens apparatus comprises a beam splitter having at least one surface coated for reflection of said infrared energy onto said infrared detector and for transmission of said visible light toward said object.

5. The improvement recited in claim 4 wherein to obtain said beam congruence the effective apertures and distances of said infrared detector and of said visible light source, respectively, relative to said beam splitter are substantially equal.

* * * * *